(12) United States Patent
Nakai et al.

(10) Patent No.: US 7,075,259 B2
(45) Date of Patent: Jul. 11, 2006

(54) MOTOR CONTROL APPARATUS FOR ADJUSTING TARGET ROTATION SPEED OF MOTOR IN ACCORDANCE WITH CURRENT CONDITION OF MOTOR LOAD

(75) Inventors: Yasuhiro Nakai, Kariya (JP); Shigeru Kamio, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/031,343

(22) Filed: Jan. 10, 2005

(65) Prior Publication Data

US 2005/0151492 A1 Jul. 14, 2005

(30) Foreign Application Priority Data

Jan. 9, 2004 (JP) ............................. 2004-003759

(51) Int. Cl.
*H02P 7/00* (2006.01)
(52) U.S. Cl. ................. 318/432; 318/434; 318/560; 318/569
(58) Field of Classification Search ........ 318/432–434, 318/560, 650, 700–800, 609, 610
See application file for complete search history.

(56) References Cited

U.S. PATENT DOCUMENTS 4,911,031 A * 3/1990 Yoshimura et al. ........... 74/335
5,053,962 A * 10/1991 Genise ......................... 701/52
5,325,029 A * 6/1994 Janecke et al. ............. 318/561
5,610,483 A * 3/1997 Obara et al. ................ 318/139
6,384,563 B1 * 5/2002 Someya ...................... 318/700
6,388,411 B1 * 5/2002 Ostrowski ................... 318/461
6,597,141 B1 * 7/2003 Wilson-Jones et al. ..... 318/560
6,992,451 B1 * 1/2006 Kamio et al. ............... 318/434
7,005,814 B1 * 2/2006 Nakai et al. ................ 318/254
2005/0156550 A1 * 7/2005 Kamio et al. ............... 318/445
2006/0033464 A1 * 2/2006 Nakai et al. ................ 318/701

FOREIGN PATENT DOCUMENTS

| JP | 2000-170911 | * | 6/2000 |
| JP | 2002-310294 | * | 10/2002 |
| JP | 2002-323127 | | 11/2002 |

\* cited by examiner

*Primary Examiner*—Rina Duda
*Assistant Examiner*—Tyrone Smith
(74) *Attorney, Agent, or Firm*—Nixon & Vanderhye PC

(57) ABSTRACT

A motor control apparatus, for controlling an electric motor to move a control object from a current position to a target position, estimates a condition of a load currently being applied to the motor (e.g., whether it is a positive or a negative load) based on the current position of the control object and predetermined data that relate positions of the control object to load conditions, and adjusts a target value of motor rotation speed in accordance with the estimation results.

10 Claims, 8 Drawing Sheets

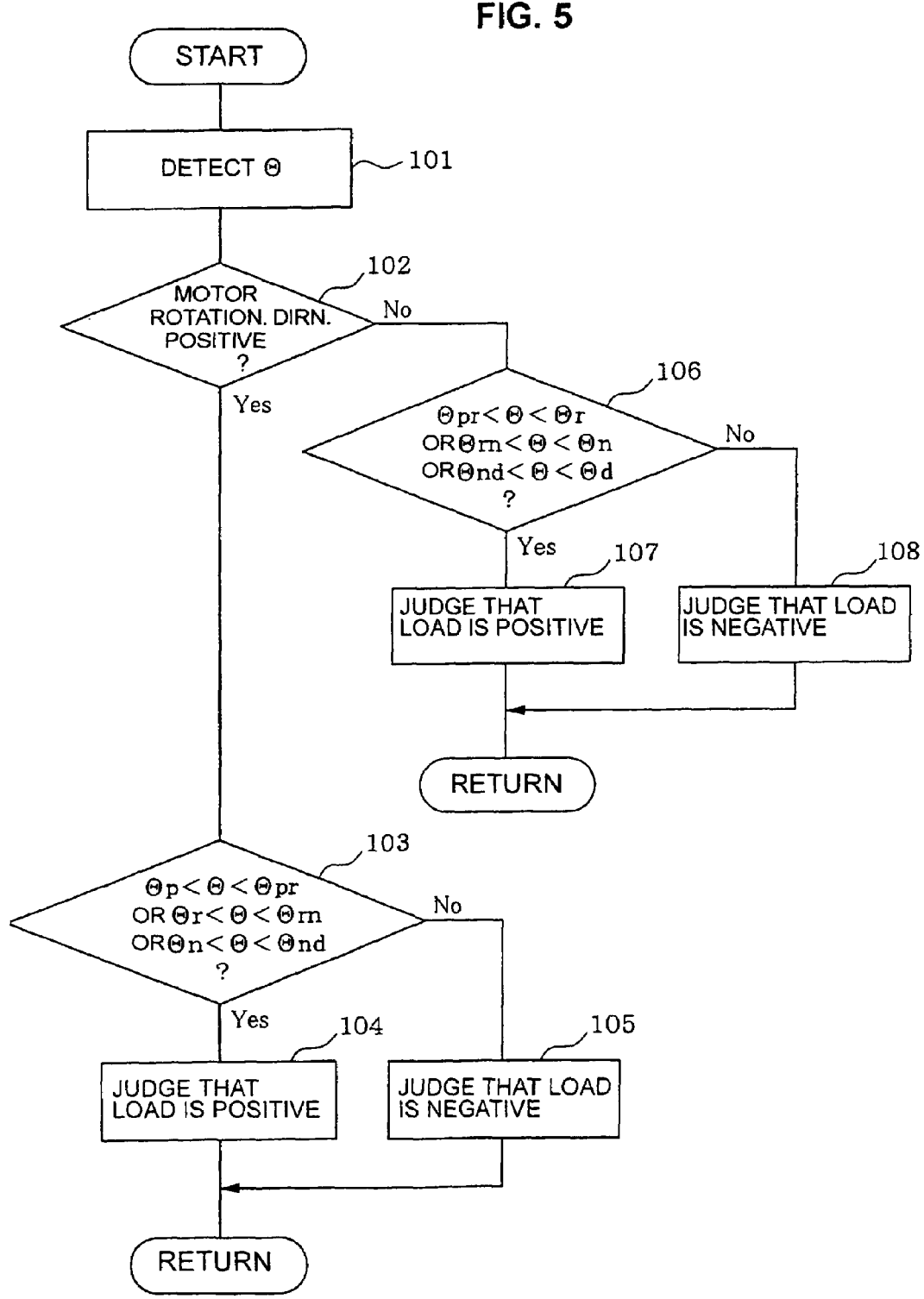

MOTOR CONTROL APPARATUS FOR ADJUSTING TARGET ROTATION SPEED OF MOTOR IN ACCORDANCE WITH CURRENT CONDITION OF MOTOR LOAD

CROSS-REFERENCE TO RELATED APPLICATIONS

This application is based on and incorporates herein by reference Japanese Patent Application No. 2004-003759 filed on Jan. 9, 2004.

BACKGROUND OF THE INVENTION

1. Field of Application

The present invention relates to a motor control apparatus for a system in which a control object is driven from a current actuation position to a target position by the motive force of an electric motor 2. Description of Prior Art In recent years, there has been an increasing trend in the field of automobile technology towards replacing mechanical systems by systems which are electrically driven, i.e., by electric motors. This is done for reasons such as reduction of the amount of space required, ease of assembly, ease of system control, etc. This is exemplified in Japanese Patent Laid-open No. 2002-323127, whereby an automatic transmission apparatus (referred to in the following simply as automatic transmission) of a vehicle is actuated to establish respective shift positions such as the drive (D) shift position, etc., through being driven by an electric motor (hereinafter referred to simply as a motor). The motor shaft is coupled through a speed reduction mechanism to an output shaft, which drives a shift position switching mechanism that directly acts on the automatic transmission to effect changeover from one shift position (i.e., shift range) to another. The motor is provided with an encoder for detecting the rotation angle of the motor shaft. When changeover of the shift position is to be performed, the motor shaft is rotated to a target value of rotation angle (expressed as a target count value of output pulses produced by the encoder) that corresponds to a target shift position. This is described in pages 3, 4 of the above-mentioned prior art patent.

However if it is attempted to more rapidly execute a shift position changeover by increasing the motor rotation speed, overshoot of a target rotation angle of the motor shaft (corresponding to the target shift position) may occur, due to the inertia of the rotor of the motor. Hence, the motor may not become halted at the required target rotation angle.

In order to be able to satisfy both the requirements for high speed of rotation of the motor and accuracy of halting the rotation the assignees of the present invention have previously proposed, in Japanese Patent Laid-open No. 2002-177739, an apparatus whereby it is determined that a motor is operating in an acceleration range, after driving of the motor has commenced, when a deviation of a detected rotation angle of the motor (obtained as a count value of a number of pulses produced from an encoder) from a target rotation angle (i.e., target count value of encoder pulses) is higher than a predetermined threshold value, while it is determined that the motor is operating in a deceleration range when the deviation is lower than the threshold value. During operation in the acceleration range, a high value is set for the target rotation speed, so that the motor will be driven to attain a high speed of rotation, while during operation in the deceleration range, a low value is set for the target rotation speed, so that the motor can be accurately halted at a target rotation angle.

However in a system in which the load imposed on a motor may vary while the motor is being driven, it is necessary to set the target rotation speed at a sufficiently low value with regard to these variations in the load. Hence, the motor operation cannot be optimized with respect to achieving a high speed of rotation.

For example, in the case of a motor-driven shift position switching apparatus for the automatic transmission of a vehicle, when changeover is performed from the P (parking) shift position to the D (drive) shift position, it is necessary for the motor to effect the changeover in the sequence:

P shift position→R (reverse) shift position→N (neutral) shift position→D shift position A detent mechanism is provided, for retaining the automatic transmission in the selected shift position. When changeover is performed for example from the P to the D shift position, then immediately before a catch member of the detent mechanism attains a tip of a circumferentially protruding portion of a detent lever, the load on the motor increases substantially. As the catch member moves over successive ones of these protruding portions of the detent lever, large variations occur in the level of motor load, i.e., with the load first increasing (as a positive-direction load) and then becoming inverted in direction (a negative-direction load), as such a protruding portion is moved over.

Hence if the target rotation speed of the motor is set in accordance with the difference between the detected rotation angle and the target rotation angle of the motor, without considering the variations in motor load, then the drive torque provided by the motor may be insufficient, when the level of motor load reaches a high level. Thus it is necessary to set a low value for the target rotation speed of the motor, in order to ensure that there will be sufficient drive torque at all times, so that an optimally high speed of rotation cannot be utilized for the motor. Furthermore, when the motor is operating under a low level of load, the drive torque may be excessively high, so that stable control cannot be achieved.

SUMMARY OF THE INVENTION

It is an objective of the present invention to overcome the above problems of the prior art by providing a motor control apparatus whereby stable control of the motor and a high speed of actuation of a control object can both be achieved, even when there are substantial variations in the level of motor load while the motor is being driven.

To achieve the above objectives, according to a first aspect, the invention provides a motor control apparatus for controlling an electric motor to apply motive force for changing a position of a control object from a current position to a target position, with the apparatus comprising load estimation means for estimating a condition of a load that is currently being driven by the motor and target rotation speed adjustment means for altering a target value of rotation speed of the motor in accordance with the estimation.

The "load condition" may simply express the direction in which a load is currently being applied to the motor, i.e., a positive load which is applying a torque to the motor shaft acting in the opposite direction to the motor rotation direction, or a negative load, which is applying a torque to the motor shaft acting in the same direction as the motor rotation direction.

The control object whose position is detected may actually be an intermediate control object, i.e., an output shaft that is driven by the motor through a rotation transmission system, with the output shaft being coupled to move a final control object. In that case, the aforementioned current position and target position will be respective rotation angles of the output shaft.

Such a motor control apparatus may further comprise position detection means for detecting the current position of the control object; and load relationship data providing means, for providing load relationship data indicative of a relationship between respective positions of the control object and corresponding values of the load.

The load relationship providing means can be a memory in which load relationship data have been fixedly stored at the time of assembly of a system which is to utilize the motor control apparatus, e.g., with the data being obtained based on design data for that system.

Alternatively, such load relationship data can be derived by the motor control apparatus itself during actual operation. In that case the motor control apparatus can include means for detecting a change of the motor load from a first condition to a second condition (while the position of the control object is being changed), with the change in motor load being detected as a transient variation in the rate of change of position of the control object while it is being moved from a current position to a target position, and with each such transient variation being detected as a transient variation in the rate of change of an output signal produced by the position detection means. Each position of the control object at which such a transient variation is detected can be registered, e.g., by being stored in a non-volatile memory, so that the position of the control object at which a change occurs from the first to the second load condition is thereby learned.

Typically, the target position of the control object will be one of a plurality of stable halting points of the control object, e.g., at which movement of the control object is restrained by the action of a detent mechanism. In that case the control apparatus can be provided with means for registering the current position of the control object (when the motor rotation is halted) as a corresponding one of the stable halting points.

From another aspect, a motor control apparatus according to the present invention may include means for detecting (while the control object is being moved towards a target position) when the control object has entered a range of positions in which the difference between the current position of the control object and the target position is less than a predetermined threshold value. This signifies that it will soon be necessary to halt the motion of the control object, at its target position. Hence, in order to enable this halting to be accurately performed, the apparatus reduces the target value of motor speed when it is detected that the control object has entered such a range of positions.

The invention can for example be advantageously applied to a shift position switching apparatus of an automatic transmission of a vehicle, for controlling change of positions of a motor-driven component part of the shift position switching apparatus to thereby effect changeover of shift positions (i.e., shift ranges) of the automatic transmission.

BRIEF DESCRIPTION OF THE DRAWINGS

FIG. 5 is a flow diagram of processing executed by a load estimation routine of the first embodiment;

DESCRIPTION OF PREFERRED EMBODIMENTS

First Embodiment

Figure 1:
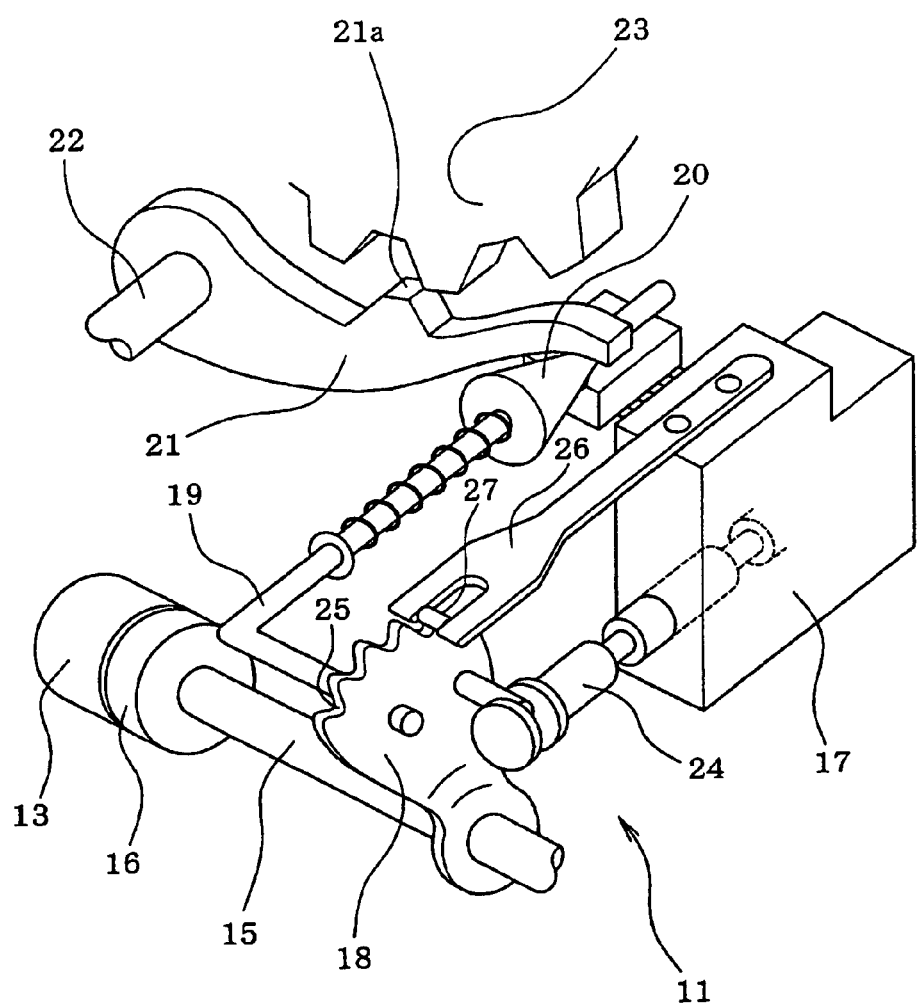
FIG. 1 is an oblique view of a shift position switching apparatus for a vehicle automatic transmission, controlled by a first embodiment of a motor control apparatus.
Figure 2:
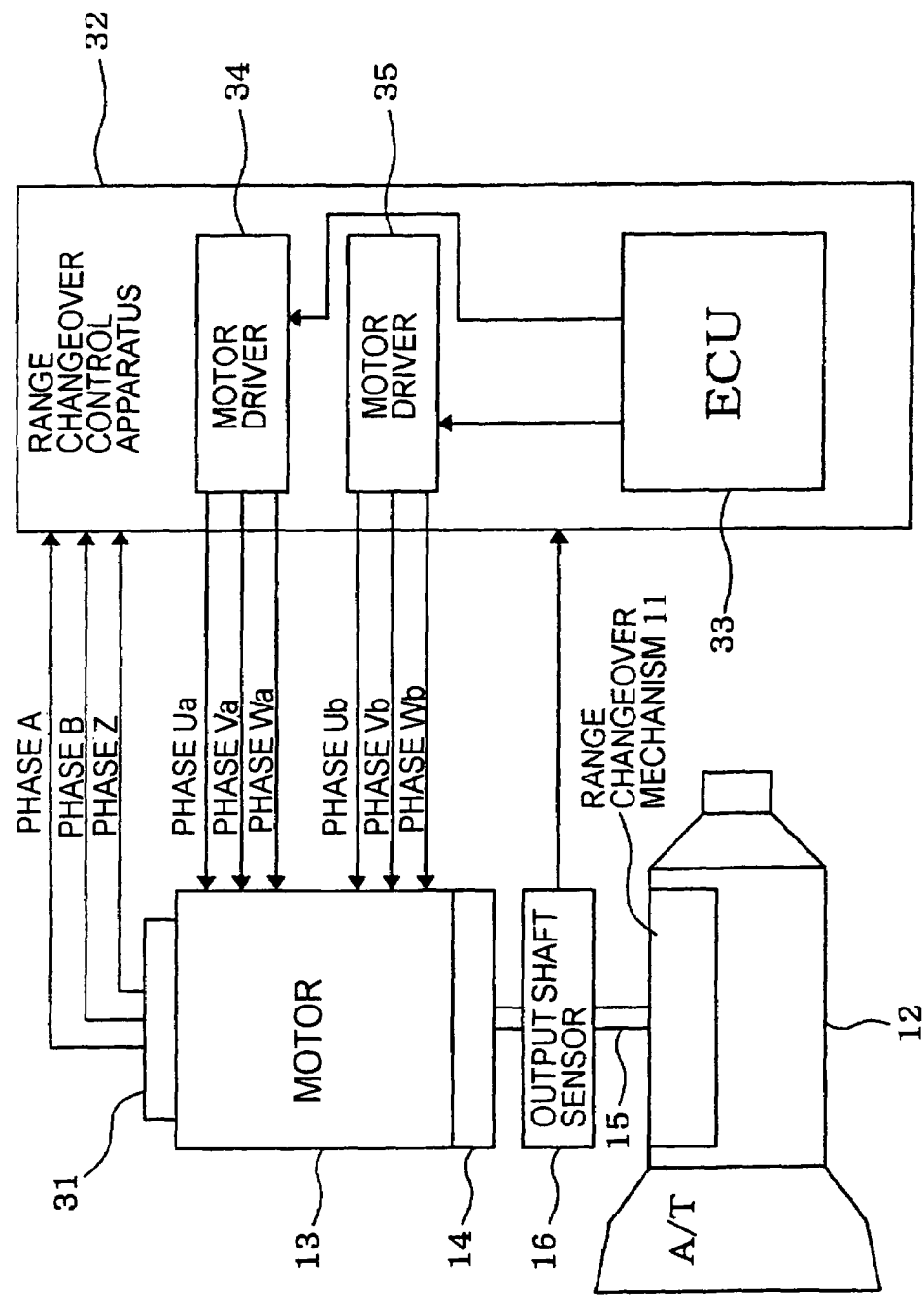
FIG. 2 shows a general block diagram of an overall control system incorporating the shift position switching control apparatus of FIG. 1.

First and second embodiments of a motor control apparatus will be described in the following, each of which is applied to a motor 13 that drives a shift position switching mechanism of the automatic transmission of a vehicle, as illustrated in FIGS. 1 and 2. In the following, it should be understood that terms such as "rotation of the motor 13" and "rotation angle of the motor 13" are used for brevity of description, in referring to rotation of the shaft of the motor 13, and to an angular position attained by the shaft of the motor 13.

FIG. 2 conceptually illustrates an overall system for controlling an automatic transmission, with the overall system incorporating a shift position switching control apparatus 32 which, in conjunction with a shaft encoder 31 and a output shaft sensor 16, constitutes the first embodiment. The overall system includes an automatic transmission 12 that is directly controlled by a shift position switching mechanism 11, with the shift position switching mechanism 11 being operated by the motor 13, which is controlled by the shift position switching control apparatus 32.

The shift position switching mechanism 11 is used to control changing of the automatic transmission 12 between respective shift positions, i.e., a parking position (P), a reverse position (R), a neutral position (N) and a drive position (D).

The motor 13 is a synchronous motor, which will be assumed to be a switched reluctance (hereinafter SR) type of motor in this embodiment. It is also assumed that the motor 13 of this embodiment has two separate stator windings, that are driven as respectively separate systems by corresponding motor drive circuits 34, 35 of the shift position switching control apparatus 32, however the invention is equally applicable to various other types of motor. The motor 13 is provided internally with a speed reduction mechanism 14, coupled between the shaft of the SR motor 13 and the shift position switching mechanism 11. The shaft sensor 16 serves to detect the rotation angle of an output shaft 15 of the speed reduction mechanism 14.

As shown in FIG. 1, the output shaft 15 has a detent lever 18 fixedly attached thereto, for adjusting the lateral position of a spool valve member 24 to thereby adjust a degree of opening of a manual valve 17, which is within an oil pressure circuit (i.e., hydraulic circuit) of the automatic transmission 12, so that the shift position that is current set for the automatic transmission is determined by the lateral position of the spool valve member 24. An L-shaped parking rod 19 is attached to the detent lever 18, and a conical member 20 that is mounted on the tip of parking rod 19 engages with a lock lever 21. The lock lever 21 serves to lock and unlock a parking gear 23, being rotated about a shaft 22 as a center of rotation, to thereby be moved upward or downward, and so moved towards or away from the parking gear 23, in accordance with the position of the conical member 20.

The parking gear 23 is fixedly mounted on the shaft of the automatic transmission 12. When the parking gear 23 is locked by the action of the lock lever 21, the rear road wheels of the vehicle are prevented from rotation, so that the vehicle will not move when the automatic transmission is set at the parked (P) position.

The detent lever 18 is coupled to the spool valve member 24 of the manual valve 17, such that when the shaft 15 and the detent lever 18 are rotated together by the SR motor 13 (acting through the speed reduction mechanism 14), the lateral position of the spool valve member 24 is changed accordingly, and the shift position of the automatic transmission 12 is thereby changed, i.e., to the parking position (P), reverse position (R), neutral position (N) or drive position (D). The detent lever 18 is formed with four holding recesses, referred to in the following as the holding recesses 25, for holding the spool valve member 24 in a position corresponding to the shift position that is selected, while rotation of the motor 13 is halted.

A detent spring 26, which holds the detent lever 18 at a position corresponding to the selected shift position, is fixed to the manual valve 17, and a catch member 27 that is provided at the tip of the detent spring 26 engages in one of the holding recesses 25 of the detent lever 18 that corresponds to the selected shift position, so that the detent lever 18 is held at a rotation angle corresponding to that selected shift position, and the spool valve member 24 is thereby held at a position corresponding to the selected shift position.

In the case of the parking (P) shift position, the parking rod 19 is moved to become adjacent to the lock lever 21, and a wide-diameter portion of the conical member 20 presses upward against the lock lever 21, so that the protruding portion 21a of the lock lever 21 engages with the parking gear 23, thereby locking the parking gear 23 in place. In that way, the shaft of the automatic transmission 12, i.e., the drive shaft of the vehicle, is held in a locked condition, so that the vehicle is held in the parking condition.

When any shift position other than the P shift position is selected, the parking rod 19 is moved away from the lock lever 21, so that the wide-diameter portion of the conical member 20 is moved back from the lock lever 21, and the lock lever 21 thereby becomes lowered. As a result, the protruding portion 21a of the lock lever 21 becomes separated from the parking gear 23, so that the locked condition of the parking gear 23 is released. The shaft of the automatic transmission 12 can then rotate, so that the vehicle can be driven.

The shaft sensor 16 is made up of a rotation sensor such as a potentiometer, producing an output voltage that changes linearly in accordance with changes in the angular position of the output shaft 15 of the speed reduction mechanism 14 of the SR motor 13, and hence in accordance with changes in the position to which the spool valve member 24 of the manual valve 17 is actuated, with that position determining the current shift position of the automatic transmission. Hence, the output voltage from the shaft sensor 16, indicating the rotation angle of the shaft 15, also serves to indicate whether the automatic transmission 12 is currently set to the parking position (P), reverse position (R), neutral position (N) or drive position (D).

As shown in FIG. 2, the SR motor 13 is provided with an encoder 31, for detecting the angular position of the rotor (not shown in the drawings) of the SR motor 13. The encoder 31 of this embodiment will be assumed to be a magnetic type of rotary encoder, which outputs three trains of pulse signals (designated as the phase A, phase B, and phase Z pulse signals, respectively) that are synchronized with the rotation of the rotor of the motor 13 (referred to in the following simply as the rotation of the motor 13), and supplies these signals to the shift position switching control apparatus 32. The ECU 33 of the shift position switching control apparatus 32 performs counting on successive rising edges and falling edges of the phase A and phase B pulse signals from the encoder 31, and controls the motor drive circuits 34, 35 to energize respective (U, V, W) phase windings of the motor 13 at appropriate timings and in an appropriate sequence for producing motor rotation in the required direction.

The current direction of rotation of the shaft of the SR motor 13 is judged by the shift position switching control apparatus 32 based on the order in which the phase A and phase B control signals are being generated by the ECU 33. The rotation direction of the motor 13 that is the direction for effecting change from the P to the D shift position of the automatic transmission will be referred to as the forward rotation direction of the motor 13. When forward rotation of the motor 13 occurs, a count value of pulses received from the encoder 31 is decremented by the ECU 33. Conversely, in the case of reverse-direction rotation (the direction for effecting change from the D to the P shift position of the automatic transmission), a count of received pulses is successively decremented. In that way, since the relationship between the count value of received encoder pulses and corresponding rotation angles of the shaft of the SR motor 13 is held fixed, irrespective of whether the SR motor 13 performs forward or reverse rotation, the rotation angle of the motor shaft can be detected based on the count value irrespective of whether the motor shaft is rotated in the forward or the reverse direction.

The phase Z pulse signal that is produced by the encoder 31 is used by the ECU 33 to detect when the motor shaft attains a reference angular position.

In the following description of first and second embodiments, the function of a motor control apparatus is to determine the actuation position of the spool valve member 24 of the manual valve 17, to thereby determine the shift position that is set for the automatic transmission. With these embodiments, the (angular) position of the output shaft 15, which actuates the spool valve member 24, is detected and utilized for position control purposes, and so the output shaft 15 can be considered to constitute a "control object", as set out in the appended claims. However it would be equally possible to provide an arrangement for detecting the (lateral) position of the spool valve member 24 and perform control in accordance with the detection results, in which case the spool valve member 24 would constitute the actual "control object" as set out in the appended claims.

When the vehicle driver operates the shift lever (not shown in the drawings) of the automatic transmission 12 to change the shift position, a signal (not shown in the drawings) is thereby inputted to the ECU 33 indicating the specified shift position, i.e., as a target shift position. In response, the ECU 33 sets a target rotation angle for the motor 13 (as a target count value of encoder pulses) in accordance with the target shift position, and begins to energize the motor 13 with feedback control applied such that when the detected rotation angle (i.e., encoder pulse count value) coincides with the target rotation angle for the motor 13, rotation of the motor 13 is halted. While the feedback control is being applied, the ECU 33 successively estimates the level of load being that is currently being driven by the motor 13 (as described hereinafter), and sets corresponding successive values of a target rotation speed of the motor 13 in accordance with the respectively estimated values of load. In doing this, the ECU 33 detects when the motor 13 enters a range of operation, referred to in the following as a "deceleration range", in which the deviation between the detected rotation angle and the target rotation angle of the motor 13 is lower than a predetermined threshold value, and in which the target rotation speed of the motor 13 is set to a low value, in order to enable the motor rotation to be accurately halted when the target rotation speed and detected rotation speed of the motor coincide.

In addition, the ECU 33 acquires the value of output voltage being produced by the output shaft sensor 16, to judge the current rotation angle of the output shaft 15 (and thereby judge the degree of actuation of the spool valve member 24 of the manual valve 17), and so judge whether the shift position that is currently established is identical to the target shift position, to determine whether it is necessary to begin (or continue with) a shift position changeover operation.

It should be noted that it would be equally possible to configure the ECU 33 whereby a corrected value of target rotation angle for the motor 13 is derived while a changeover operation is in progress, with the correction being applied in accordance with the difference between the current rotation angle and target rotation angle of the output shaft 15, so that the target rotation angle can be set under a condition in which backlash in the rotation transmission system (i.e., speed reduction mechanism 14) does not affect the relationship between angular positions of the shaft of the motor 13 and the output shaft 15.

Figure 3:
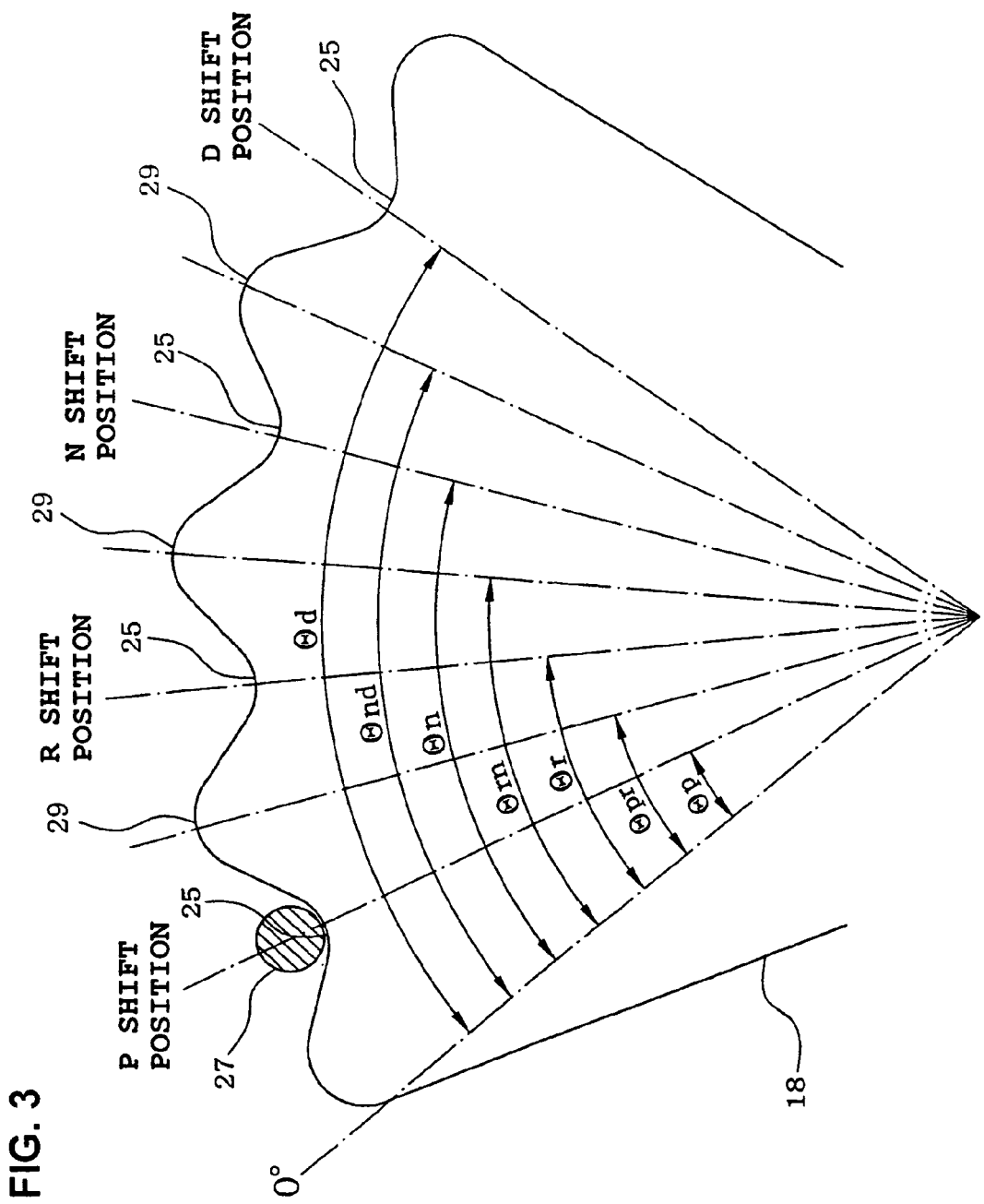
FIG. 3 is a diagram for describing position relationships between respective holding recesses formed in a detent lever and a catch member of a detent spring mechanism.

The method whereby the value of load being applied to the motor 13 is estimated will be described in the following. As shown in FIG. 1, the shift position switching mechanism 11 includes a detent mechanism 28, for retaining a shift position that has been set for the spool valve member 24 of the manual valve 17 (i.e., after rotation of the motor 13 has been halted). The shape of a peripheral portion of the detent lever 18 of the detent mechanism 28 is illustrated in FIG. 3. This is formed with radially outwardly protruding portions 29, referred to in the following as detent protrusions, with each adjacent pair of the detent protrusions 29 enclosing a holding recess 25 that corresponds to a specific one of the shift positions. While the motor 13 is not being driven, the catch member 27 is retained in one of the holding recesses 25 by the force applied by the detent spring 26.

Thus for example when changeover is performed from the P to the D shift position, the catch member 27 must move successively over each of three of the detent protrusions 29, while being urged towards the detent lever 18 by the action of the detent spring 26. While the catch member 27 is moving upward (i.e., where "up" signifies a radially outward direction with respect to the rotation axis of the output shaft 15) along a sloping face of a detent protrusion 29, a positive direction of load is imposed on the motor 13, due to the force exerted by the detent spring 26. When the catch member 27 reaches the apex of a detent protrusion 29, the level of load is determined only by the friction between the catch member 27 and the detent lever 18. While the catch member 27 is moving downward along a sloping face of a detent protrusion 29, a negative direction of load is imposed on the motor 13. That is to say, the force exerted by the detent spring 26 results in a torque being applied to the output shaft 15 acting in the same direction as the direction of rotation of the output shaft 15.

Figure 4A:
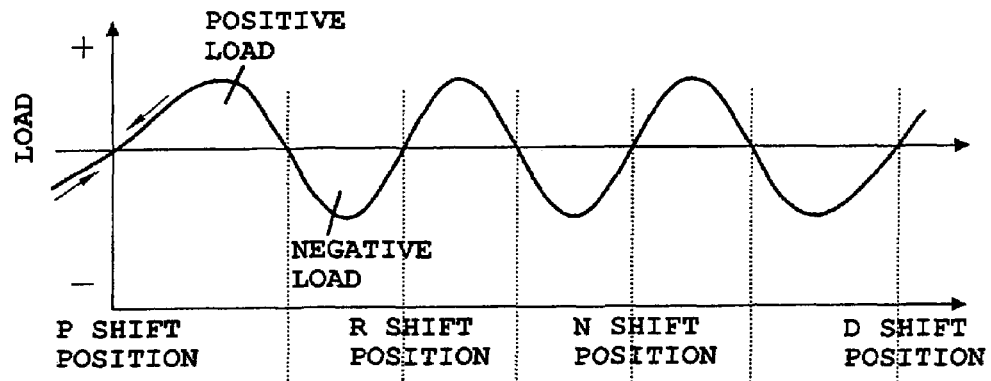
FIGS. 4A, 4B and 4C are diagrams illustrating variations in motor load that occur during a shift position changeover operation, and corresponding changes in a target value of motor rotation speed.
Figure 4B:
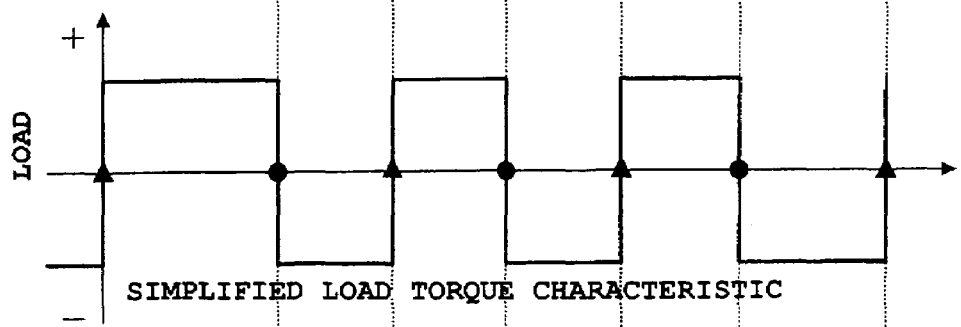
Figure 4C:
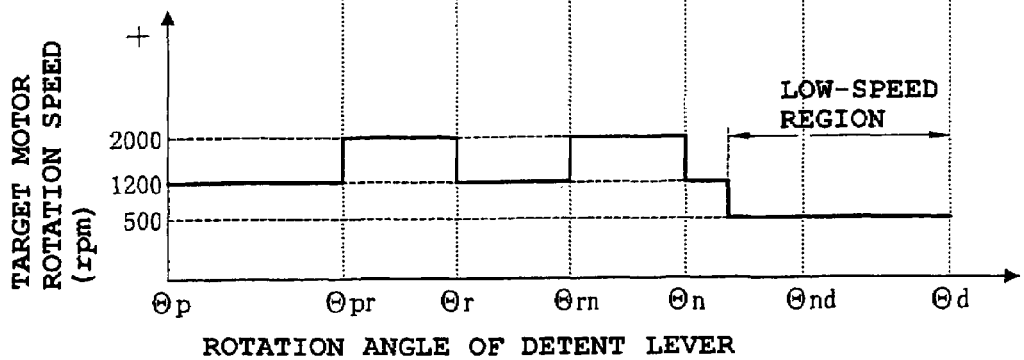

Hence, there is a sudden large amount of change in the load of the motor 13 as the catch member 27 moves from one side to another side of an apex of a detent protrusion 29. This is illustrated in FIGS. 4A to 4C. As shown in FIG. 4A, when the catch member 27 moves from the holding recess 25 corresponding to the P shift position to the holding recess 25 corresponding to the R shift position, the motor load first has a positive direction, as described above, then falls to zero (as the holding recess 25 reaches the apex of the detent protrusion 29 located between the holding recesses 25 at the P and R positions), then has a negative direction, as the catch member 27 moves from that apex position to the holding recess 25 of the R shift position.

FIG. 4B is a simplified load torque characteristic diagram for the motor 13, corresponding to FIG. 4A. In FIG. 4B, the circular black dots correspond to the respective innermost parts of the holding recesses 25, while the black triangular symbols correspond to the respective apexes of the detent protrusions 29.

With this embodiment, the ECU 33 includes a memory (not shown in the drawings) having load relationship data held fixedly stored therein, which have been established based on design data for the shift position switching mechanism 11 during manufacture, e.g., at the stage of assembly. The load relationship data express the relationship between respective rotation angles of the detent lever 18 (i.e., of the output shaft 15) and corresponding positions of the holding recesses 25 and detent protrusions 29, and thereby express the relationship between the rotation angles of the detent lever 18 and corresponding values relating to load (e.g., as illustrated in FIG. 4B, corresponding directions of load) applied to the motor 13.

With this first embodiment, during rotation of the motor 13, the rotation angle of the detent lever 18 is detected by the output shaft sensor 16 and is used in conjunction with the stored load relationship data to judge whether the catch member 27 is currently moving upward along a sloping face of the detent protrusion 29 (so that a positive direction of load is being applied to the motor 13) or is moving downward along such a sloping face (so that a negative direction of load is being applied to the motor 13).

In FIGS. 4A, 4B, 4C it is assumed that shift position changeover is performed from the P to the D shift position, so that forward rotation of the motor 13 occurs (i.e., anti-clockwise rotation of the detent lever 18, as viewed in FIG. 3). If the changeover were to be performed from the D to the P position, so that reverse-direction rotation of the motor 13 occurs, the positive and negative polarities of the respective regions in the torque characteristics of FIGS. 4A, 4B would be the opposite of those shown in FIGS. 4A, 4B.

The ECU 33 executes the load estimation routine shown in FIG. 5 to judge whether the load that is currently being imposed on the motor 13 acts in a positive or a negative direction. In addition, the ECU 33 executes a target motor rotation speed setting routine shown in FIG. 6, to set a target value of motor rotation speed, designated as Vtg, in accordance with the level of motor load. More specifically, in executing this routine, the ECU 33 determines the target motor rotation speed Vtg in accordance with whether the motor is currently operating under a positive load, as described above, and also judges whether the deviation |θtg−θ| between the detected motor rotation angle θ and the target value of motor rotation angle θtg is below a predetermined deceleration range judgment threshold value K, to thereby determine whether the motor rotation has progressed to reach a deceleration range, in which the rotation is to be halted. If the motor 13 is found to be operating within the deceleration range, then the value of target motor rotation speed Vtg is lowered. These routines will be described in more detail in the following.

Load Estimation Routine

The load estimation routine of FIG. 5 is executed periodically while the motor 13 is being driven, for example with these executions being synchronized with the A phase and B phase signals of the shaft encoder 31. Firstly in step 101, the rotation angle Θ of the detent lever 18 (i.e., the rotation angle of the output shaft 15) is acquired using the output shaft sensor 16, then step 102 is executed in which a decision is made as to whether the direction of rotation of the motor 13 is positive (corresponding to the direction of rotation for performing changeover from the P to the D shift position) or negative. If the direction of rotation is positive then step 103 is executed, in which a decision is made as to whether the current rotation angle Θ of the detent lever 18 is within a range whereby a positive load is being applied to the motor 13, i.e., the catch member 27 of the detent spring 26 is moving up (where "up" is as defined hereinabove) a sloping face of a detent protrusion 29 during forward direction rotation of the motor 13. This is done by judging whether any one of the following conditions is satisfied:

Θp<Θ<Θpr; Θr<Θ<Θrn; Θn<Θ<Θnd.

With this embodiment, the aforementioned load relationship data are constituted by respective values for Θp, Θpr, Θr, Θrn, Θn, Θnd and Θd, which are shown in FIG. 3. Here, Θp corresponds to the lowest part of the holding recess 25 for the P shift position, Θpr corresponds to the position of the apex of the detent protrusion 29 located between the P and R positions, Θr corresponds to the lowest part of the holding recess 25 for the R shift position, Θrn corresponds to the position of the apex of the detent protrusion 29 located between the R and N positions, Θn corresponds to the lowest part of the holding recess 25 for the N shift position, Θnd corresponds to the position of the apex of the detent protrusion 29 that is located between the N and D positions, and Θd corresponds to the lowest part of the holding recess 25 for the D shift position.

If there is a YES decision in step 103, then since this indicates that the catch member 27 is climbing up a sloping face of a detent protrusion 29, processing proceeds to step 104, in which it is judged that the direction of load applied to the motor 13 is positive.

If there is a NO decision in step 103, then since this indicates that the catch member 27 is sliding down a sloping face of a detent protrusion 29, processing proceeds to step 105, in which it is judged that a negative direction of load is being applied to the motor 13.

If it is found in step 102 that the motor 13 is rotating in the negative direction (the direction for performing changeover from the D to the P shift position), processing proceeds to step 106, in which a decision is made as to whether the current rotation angle Θ of the detent lever 18 is within a range whereby the catch member 27 of the detent spring 26 is moving up a sloping face of a detent protrusion 29 (so that the direction of load on the motor 13 is positive) during the negative-direction rotation of the motor 13. This is done by judging whether any one of the following conditions is satisfied:

Θpr<Θ<Θr; Θrn<Θ<Θn; Θnd<Θ<Θd.

If there is a YES decision in step 106, then since this indicates that the catch member 27 is climbing up a sloping face of a detent protrusion 29, processing proceeds to step 107, in which it is judged that the direction of load is positive. If there is a NO decision in step 106, then since this indicates that the catch member 27 is sliding down a sloping face of a detent protrusion 29, processing proceeds to step 108, in which it is judged that the load direction is negative.

Target Motor Rotation Speed Setting Routine

Figure 6:
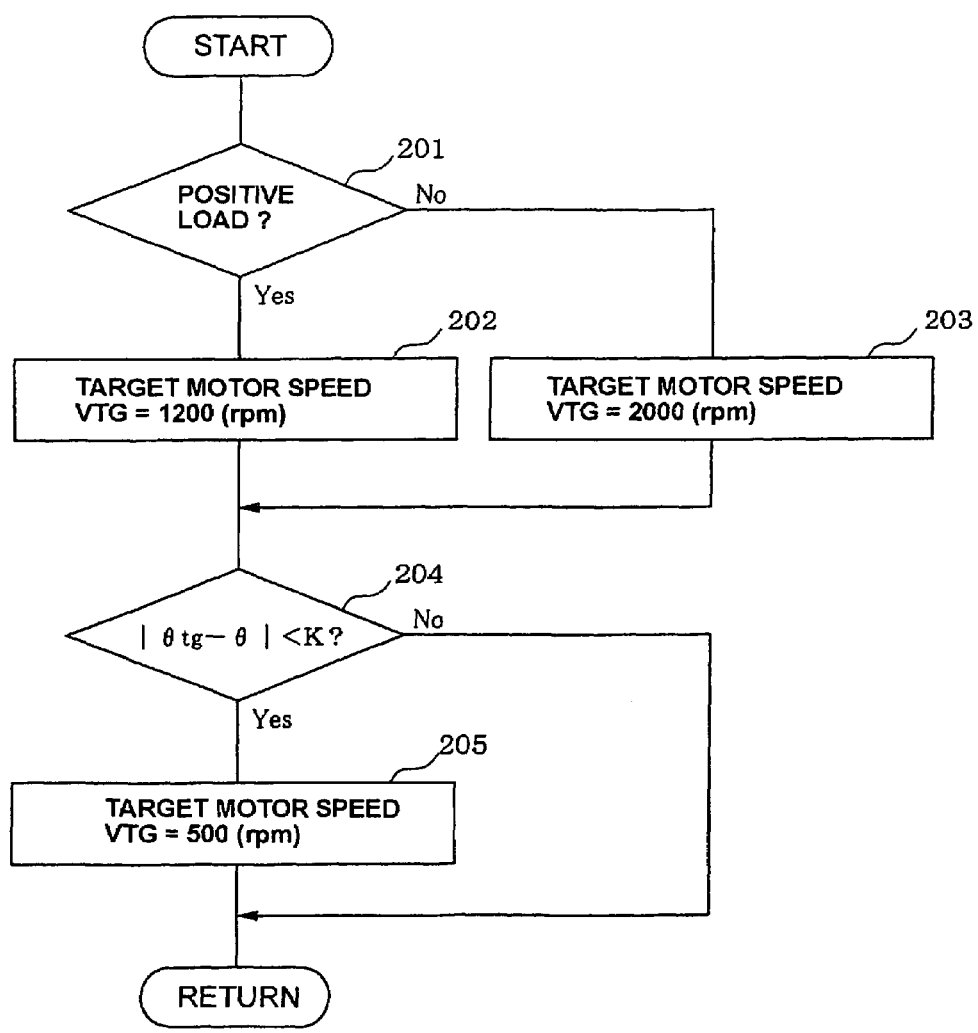
FIG. 6 is a flow diagram of processing executed by a target motor rotation speed setting routine of the first embodiment.

The target motor rotation speed setting routine shown in FIG. 6 is executed periodically while the motor 13 is being driven, for example with these executions being synchronized with the A phase and B phase signals of the shaft encoder 31. Firstly in step 201, a decision is made as to whether a positive direction of load is currently applied to the motor 13, with that decision being based on the results obtained by a preceding execution of the load estimation routine of FIG. 5. If the load direction is found to be positive, processing proceeds to step 202, in which a target value of motor rotation speed is set. That target value is selected as being within an intermediate range of motor speed, in which the motor 13 can generate a high level of torque, and is assumed to be 1200 rpm with this embodiment. In that way it can be ensured that the motor 13 generates sufficient torque for the catch member 27 to climb to the apex of a detent protrusion 29.

If it is found in step 201 that the load direction is negative, processing proceeds to step 203, in which a high value of target rotation speed (in this example, 2000 rpm) is set for the motor 13.

Following either of steps 202, 203, step 204 is executed in which a decision is made as to whether the deviation |θtg−θ| between the detected motor rotation angle θ and the target value of motor rotation angle θtg is below a deceleration range judgment threshold value K, to thereby determine whether the motor rotation has progressed to reach a deceleration range in which the rotation is to be halted. If it is judged that |θtg−θ|≧K, then execution of this routine is terminated. If it is judged that |θtg−θ|<K then step 205 is executed, in which a low value of target rotation speed (in this example, 500 rpm) is set for the motor 13. This ensures that the motor 13 can be accurately halted at the target rotation angle θtg.

It should be noted that it would be equally possible to base the decision as to whether the motor 13 is operating in a deceleration range upon whether the deviation |Θtg−Θ| between the rotation angle Θ of the detent lever 18 (i.e., detected rotation angle of the output shaft 15) and the target rotation angle Θtg of the detent lever 18 (corresponding to the target shift position) is below a predetermined deceleration range judgment threshold value.

With the first embodiment described above, information relating to the value of load applied to the motor 13 is estimated while the motor is being driven, and the target value of motor rotation speed Vtg is adjusted in accordance with the estimation results. Hence, even if the load imposed on the motor 13 varies substantially in magnitude and/or direction as the motor 13 is being driven, appropriate values for Vtg can be successively set, in accordance with the variations in load. As a result, stable control of the motor can be achieved together with a high speed of actuating the control object that is driven by the motor.

With the first embodiment, the level of load of the motor 13 is estimated based on the rotation angle of the output shaft 15 (detected using the output shaft sensor 16) in conjunction with the predetermined load relationship data, so that the embodiment has the advantage that it is unnecessary to provide any additional device such as a load sensor for the purpose of estimating the load condition of the motor. Hence, such a motor control apparatus can be implemented at low cost.

The rotation angle of the motor 13 is converted into a rotation angle of the output shaft 15 (i.e., rotation angle of the detent lever 18) by being transferred through a rotation transmission system such as the speed reduction mechanism 14. There is some degree of backlash in various components of such a rotation transmission system, e.g., due to spaces between meshing teeth of gears within the speed reduction mechanism 14. In addition, from considerations of ease of assembly, at the stage of manufacture, there will be some amount play in a coupling between an outer end of the shaft of the motor 13 and the output shaft 15. The combination of these will be referred to as the backlash in the rotation transmission system. As a result, when the motor 13 is driving the output shaft 15 for rotation and the direction of the load applied to the output shaft 15 becomes inverted (as described above), the relationship between the respective rotation angles of the shaft of the motor 13 and the output shaft 15 will become incorrect due to the effects of the backlash in the rotation transmission system. Hence, if the load that is currently applied to the motor 13 were to be estimated based upon rotation angle values for the detent lever 18 (i.e., the output shaft 15) that are derived from the detected rotation angle of the motor 13, errors might occur in the load estimates.

However with the first embodiment, since the load condition is estimated based upon the rotation angle of the output shaft 15 as detected using the output shaft sensor 16, the estimated values of rotation angle of the detent lever 18 are unaffected by the backlash in the rotation transmission system. Hence the condition of load that is currently applied to the motor 13 can be accurately estimated, unaffected by the backlash, by using the aforementioned stored load relationship data in conjunction with the detected rotation angle of the output shaft 15.

It should be noted that if the invention were to be applied to system having only a small amount of backlash in the rotation transmission system, so that the shaft of the motor 13 and the output shaft 15 rotate substantially together at all times, it would be possible to estimate the load on the motor based on the detected rotation angle of the motor 13 in conjunction with the load relationship data.

Second Embodiment

With the first embodiment described above, data expressing rotation angles of the detent lever 18 at which inversions of the direction of load of the motor 13 occur and rotation angles corresponding to the shift positions (i.e., the angular positions $\Theta p$, $\Theta pr$, $\Theta r$, $\Theta rn$, $\Theta n$, $\Theta nd$, $\Theta d$ shown in FIG. 3) are stored beforehand in a memory as load relationship data, and used in conjunction with the detected rotation angle of the detent lever 18 as described above, to judge whether the direction of load applied to the motor 13 is positive or negative (i.e., to judge whether the catch member 27 is currently climbing up a sloping peripheral face of the detent lever 18, or sliding down such a sloping face). With the first embodiment, such load relationship data are prepared beforehand at the stage or manufacture, based upon design information, etc. A second embodiment will be described, referring to FIGS. 7 and 8, whereby the angular positions of the detent lever 18 at which the load direction becomes inverted are learned (i.e., are detected and then stored in a non-volatile memory) by the motor control apparatus during its operation.

While the motor 13 is halted, the catch member 27 of the detent spring 26 is engaged in a lowermost portion of one of the holding recesses 25 of the detent lever 18 (corresponding to the currently set shift position). In that condition, with the second embodiment, the respective angular positions of the detent lever 18 at which the catch member 27 is engaged in these lowermost portions of the holding recesses 25 (these portions being referred to in the following as "stable halting points" for the respective shift positions) are learned by the system. For example, when the detent lever 18 is halted at the P shift position, the rotation angle of the detent lever 18 at that time (as detected by using the output shaft sensor 16) is learned, to be stored in a memory (not shown in the drawings) of the ECU 33 as the stable halting point of the P shift position. The respective stable halting points for the R, N and D shift positions are similarly learned.

In addition with this embodiment, while the motor 13 is being driven, the amount of backlash in the rotation transmission system is used in the process of learning the respective rotation angles $\Theta pr$, $\Theta rn$, $\Theta nd$ at which the catch member 27 attains the apexes of the detent protrusions 29 that are located:

(a) between the stable halting points of the P and R shift positions, (b) between the stable halting points of the R and N shift positions, and (c) between the stable halting points of the N and D shift positions.

As described above, when the catch member 27 moves over one of these apexes of a detent protrusion 29, the direction of the load applied to the motor becomes inverted. Immediately after the inversion of load direction occurs, the output shaft 15 momentarily enters a condition of free rotation in relation to the shaft of the motor 13, due to the backlash in the rotation transmission system. The rate of rotation of the output shaft 15 thereby abruptly increases during a brief interval (due to the torque being applied to the detent lever 18 by the detent spring 26, acting through the catch member 27) until the backlash is taken up. The detent lever 18 then again becomes driven by the motor 13 (assisted by the torque applied from the detent spring 26, as a negative direction of load). As a result, there is an abrupt change in rate of variation of the output voltage produced by the output shaft sensor 16 at each occurrence of load direction inversion, with the magnitude of that change being determined by the amount of backlash.

Figure 8:
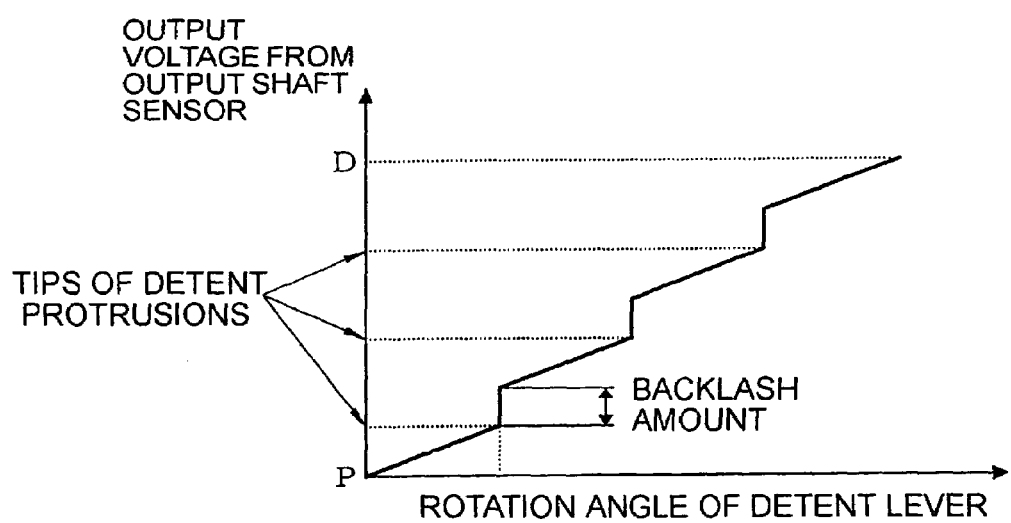
FIG. 8 is a graph showing the relationship between the output voltage of an output shaft rotation sensor and successive values of rotation angle of the detent lever, attached to the output shaft, during a shift position changeover operation with the second embodiment.

This is illustrated in FIG. 8, showing the relationship between the output voltage from the output shaft sensor 16 and values of rotation angle of the detent lever 18, for the case of changeover from the P to the D shift position. As shown, a transient change occurs in the rate of variation of the detection voltage of the output shaft sensor 16 each time the catch member 27 moves over an apex of a detent protrusion 29, due to a sudden change in rotation speed of the detent lever 18. The respective rotation angles Θpr, Θrn, Θnd of the detent lever 18, at which these transient changes in the rate of variation of the detection voltage produced by the output shaft sensor 16 occur, are detected and stored in a memory, i.e., are learned, by the ECU 33 of this embodiment.

Figure 7:
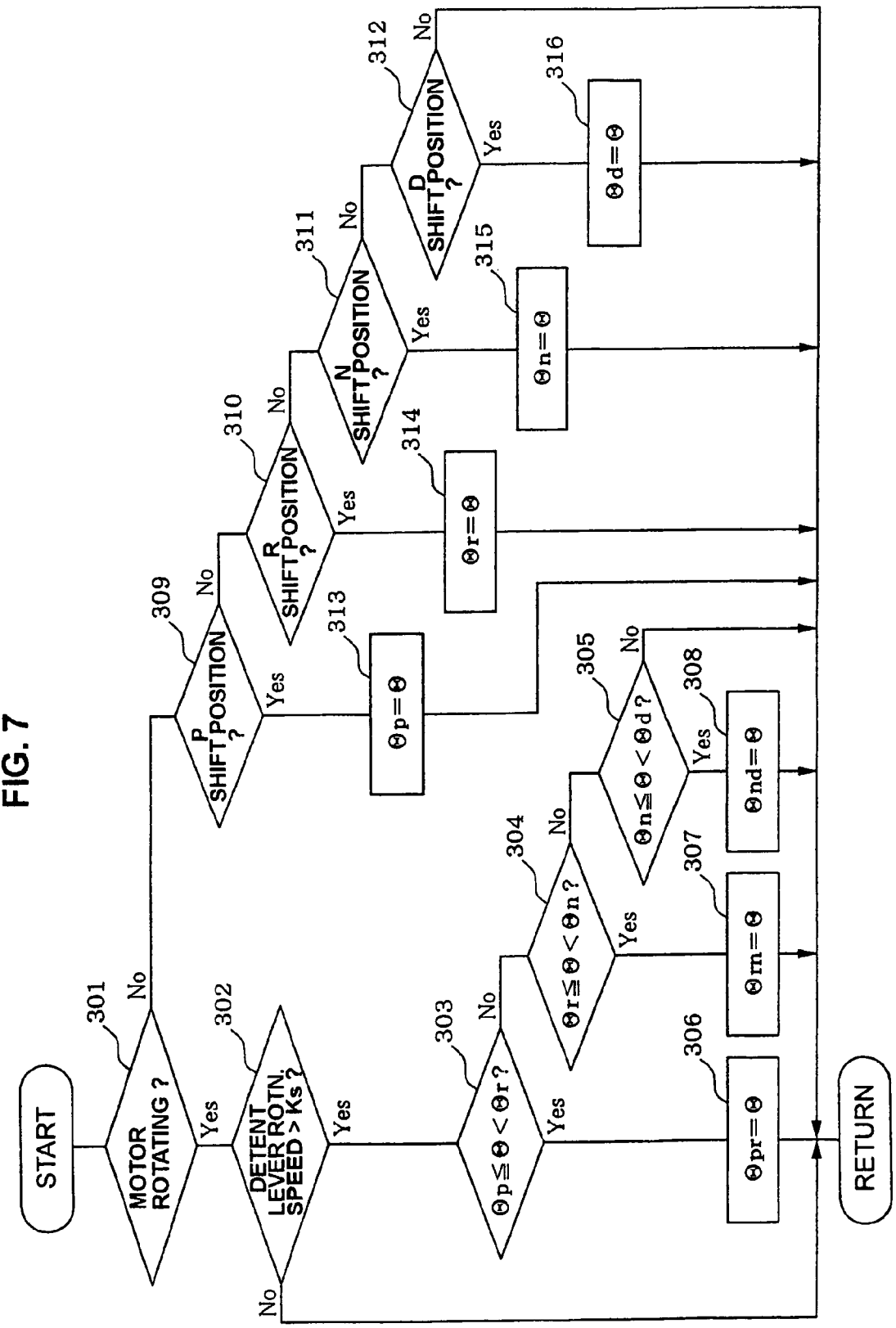
FIG. 7 is a flow diagram of processing executed by a load inversion position learning routine of a second embodiment.

This learning is performed by executing the load inversion position learning routine shown in FIG. 7, which is executed periodically at regular intervals, so long as the ECU 33 is in operation. Firstly, in step 301 a decision is made as to whether the motor 13 is being driven. If the rotation of the motor 13 is currently halted, then a decision is made in a series of steps 309 to 312 as to which of the shift positions (P, R, N, D) is currently set. If it is judged in step 309 that the currently set shift position is P, then processing proceeds to step 312 in which the rotation angle Θ of the output shaft 15, detected by means of the output shaft sensor 16, is learned as the stable halting point Θp for the P shift position. The respective stable halting points Θr, Θn and Θd for the R, N and D shift positions are each learned in the same manner, in steps 314 to 316 respectively.

If it is found in step 301 that the motor 13 is currently being driven, then processing proceeds to step 302, in which a decision is made as to whether the rotation speed of the detent lever 18 is higher than a predetermined decision value Ks. As described above, when the output shaft 15 becomes momentarily uncoupled from the shaft of the motor 13 due to the effect of backlash, at a point when the direction of load becomes inverted as described above, there is an abrupt change in the rotation speed of the output shaft 15, with a corresponding abrupt change in the rate of variation of the output voltage from the output shaft sensor 16. It is an occurrence of such a change in the rate of variation of the output voltage of the output shaft sensor 16 that is judged by step 302. If that condition is not detected, i.e., the catch member 27 is not currently moving over the apex of a detent protrusion 29 (a NO decision), then execution of this routine is ended.

If there is a YES decision in step 302, so that it is known that the catch member 27 is currently passing over the apex of one of the detent protrusions 29, then one or more of a series of steps 303 to 304 are executed, to judge which of the detent protrusions 29 is currently being traversed by the catch member 27. More specifically, a decision is made as to which pair of stable halting points are located on opposing sides of the detent protrusion 29 that is currently being traversed by the catch member 27.

If for example it is judged in step 303 that the detent protrusion 29 is at a rotation angle Θ which meets the condition Θp≦Θ≦Θr, then processing proceeds to step 306, in which it is judged that (i.e., learned that) the current rotation angle of the output shaft 15 correspond to the position Θpr of the detent protrusion 29 that is located between the P and R stable halting points.

Similarly, if it is judged in step 304 that the detected detent protrusion 29 is located at a position Θ which meets the condition Θr≦Θ≦Θn, then processing proceeds to step 307, in which it is judged that the current rotation angle of the output shaft 15 corresponds to the position Θrn of the detent protrusion 29 that is located between the R and N stable halting points, and if it is judged in step 305 that the detected detent protrusion 29 is located at a position Θ which meets the condition Θn≦Θ≦Θd, then processing proceeds to step 308, in which it is judged that the current rotation angle of the output shaft 15 corresponds to the position Θnd of the detent protrusion 29 that is located between the N and D stable halting points.

The angular positions Θp, Θpr, Θr, Θrn, Θn, Θnd and Θd which are thereby learned are stored in a non-volatile type of rewritable memory (not shown in the drawings) of the ECU 33.

With the second embodiment, the load estimation routine of FIG. 5 and the target motor rotation speed setting routine of FIG. 6 are executed in the same way as described hereinabove for the first embodiment. However data expressing the angular positions Θp, Θpr, Θr, Θrn, Θn, Θnd and Θd, used in steps 103 and 106 of FIG. 5, are read out from the aforementioned non-volatile type rewritable memory, having been previously learned by the processing described above.

With the second embodiment, a set of values for the load inversion positions and a set of values of the respective stable halting points of the various shift positions of the automatic transmission are learned by the system itself. Hence, even if there are variations between such sets of values for different shift position switching apparatuses, due to manufacturing deviations etc., or if variations in the values arise due to wear of mechanical components during the operating lifetime of a system, such variations will not adversely affect the operation of the motor control apparatus, since the angular values for the load inversion positions and stable halting points are derived by learning processing performed by the motor control apparatus, which can be repeated whenever necessary. Hence, accurate estimation of motor load and stable operation of the motor control apparatus can be ensured, even under long-term use.

With the second embodiment, the processing described above for learning the positions Θpr, Θrn and Θrd of specific detent protrusions 29 that are each located between a pair of shift positions is performed based on changes in the rate of change of the output voltage produced by the output shaft sensor 16, indicative of changes in the speed of rotation of the output shaft 15. However it would be possible to perform that learning processing by detecting the positions of these detent protrusions 29 based upon changes in the rotation speed of the motor 13, i.e., as expressed by changes in the frequency of the pulses generated by the shaft encoder 31. These rotation speed changes will occur during each of the aforementioned brief intervals when the motor shaft momentarily ceases to drive the detent lever 18, due to the effects of backlash as described above, as the motor load changes from a positive to a negative direction.

Also, with the first and second embodiments described above, the rotation angle of the output shaft 15 (and hence, the detent lever 18) is detected, by means of the output shaft sensor 16. However it would be equally possible to utilize detection of the position of the final control object, i.e., the spool valve member 24 of the manual valve 17, by providing a suitable arrangement for detecting the lateral position of the spool valve member 24 and producing a corresponding detection signal. The essential point is that it is necessary to detect motion (angular or lateral) of either the output shaft 15 or of a component, such as the spool valve member 24, which moves together with the output shaft 15.

The above embodiments have been described for application to an automatic transmission having P, R, N, and D shift positions. However the invention would be equally applicable to a shift position switching mechanism of an automatic transmission that also has a low (L) shift position, or only two shift positions, P and NotP.

It should be noted also that a motor control apparatus according to the present invention is not limited in application to an SR motor which actuates an automatic transmission shift position switching mechanism, and would be applicable to controlling SR motors or other types of motors used in various other applications.

What is claimed is:

1. A motor control apparatus for controlling an electric motor to apply motive force for changing a position of a control object from a current position to a target position, comprising first detection means for producing a first detection signal that is indicative of said current position of said control object, and second detection means for producing a second detection signal that is indicative of an angular position of a drive shaft of said motor, load estimation means for estimating a condition of a load that is currently being applied to said motor, and target rotation speed adjustment means for adjusting a target value of rotation speed of said motor in accordance with an estimation result obtained by said load estimation means;

wherein said load estimation means estimates said load condition based upon a rate of change of a specific one of said first and second detection signals during said changing of position of said control object.

2. A motor control apparatus according to claim 1, wherein said load estimation means comprise load relationship data providing means for detecting respective values of said first sensor signal at which transient variations occur in said rate of change, with each of said transient variations corresponding to a reversal of a direction of action of said load, and for thereby deriving load relationship data that relate said reversals of direction to corresponding positions of said control object.

3. A motor control apparatus according to claim 2, wherein said load relationship data providing means comprise memory means for storing said load relationship data.

4. A motor control apparatus according to claim 3, wherein said load relationship data are derived and fixedly stored in said memory means prior to a commencement of utilization of said apparatus.

5. A motor control apparatus according to claim 1, said target position of said control object being one of a plurality of stable halting points of said control object, wherein said control apparatus comprises means for registering a current position of said control object, while rotation of said motor is halted, as a corresponding one of said stable halting points.

6. A motor control apparatus according to claim 1, comprising means for detecting when said control object has entered a range of positions thereof in which a difference between a current position of said control object and said target position is less than a predetermined threshold value, during said changing of position of said control object, and for reducing said target value of rotation speed when it is detected that said control object is within said range.

7. A motor control apparatus according to claim 1 wherein said control object is an output shaft that is driven by said motor through a rotation transmission system, and said current position and target position are respective rotation angles of said output shaft.

8. A motor control apparatus according to claim 7 wherein said output shaft is coupled to a component part of shift position switching apparatus of an automatic transmission of a vehicle, for effecting changeover of a shift position of said automatic transmission by actuating said component part.

9. A motor control apparatus according to claim 1 wherein said control object is a component part of a shift position switching apparatus of an automatic transmission of a vehicle, and wherein changes in position of said component part are performed to effect changeover of a shift position of said automatic transmission.

10. A motor control apparatus according to claim 3, comprising means for periodically executing a learning processing operation for successively deriving updated sets of values constituting said load relationship data, and for storing said updated sets of values in said memory means.

* * * * *